United States Patent
Potocki

(10) Patent No.: US 7,735,864 B2
(45) Date of Patent: Jun. 15, 2010

(54) ROLL SUPPORT STRUCTURE PADDING

(76) Inventor: John Potocki, 30 Segovia Ct., Hanover, PA (US) 17331

( * ) Notice: Subject to any disclaimer, the term of this patent is extended or adjusted under 35 U.S.C. 154(b) by 13 days.

(21) Appl. No.: 12/151,612

(22) Filed: May 8, 2008

(65) Prior Publication Data

US 2008/0284206 A1    Nov. 20, 2008

Related U.S. Application Data

(60) Provisional application No. 60/930,534, filed on May 17, 2007.

(51) Int. Cl.
*B60R 21/04* (2006.01)
(52) U.S. Cl. .................... 280/751; 296/187.03
(58) Field of Classification Search ............. 280/751, 280/756; 296/187.03, 187.05, 190.03
See application file for complete search history.

(56) References Cited

U.S. PATENT DOCUMENTS

| | | | | |
|---|---|---|---|---|
| 3,712,664 A | * | 1/1973 | May ........................ 296/102 |
| 4,853,270 A | * | 8/1989 | Wycech ..................... 428/68 |
| 5,460,409 A | | 10/1995 | Conner | |
| 6,189,962 B1 | * | 2/2001 | Henderson ................. 296/218 |
| 7,219,925 B2 | * | 5/2007 | Hill ........................... 280/756 |
| 2006/0170203 A1 | * | 8/2006 | Nowack et al. ............ 280/756 |

* cited by examiner

*Primary Examiner*—Paul N Dickson
*Assistant Examiner*—Robert A Coker
(74) *Attorney, Agent, or Firm*—John E. Simms, Jr.

(57) ABSTRACT

Roll support structure padding for use in a motor vehicle having a roll support structure formed of interconnected rigid members. The padding is formed of a two component flexible integrated skin molded polyurethane. The padding is formed in generally elongate body having a recess for partially encasing the support structure members. The body has a thickness of approximately 2.5 centimeters and is compressible to gradually decelerate a vehicle occupant coming into contact with the padding. Sections of the padding are installed on the support structure to partially encase the support structure members in padding and provide protection from impact, for the operator of the motor vehicle.

4 Claims, 2 Drawing Sheets

ROLL SUPPORT STRUCTURE PADDING

CROSS REFERENCE TO OTHER APPLICATIONS

Applicant claims the benefit of Provisional Application No. 60/930,534, filed 17 May 2007, by the present inventor.

BACKGROUND

Many forms of automotive sport are popular in both amateur and professional circles using four wheeled vehicles. Operators compete and test their skills in speed and maneuverability. With advances in technology, the speed capabilities of vehicles used in competition has steadily increased. The risk of accidental injury involving high speed and possibly an interaction with a vehicle having substantial momentum call for the use of suitable and effective safety equipment. The risk of head and cervical spine injuries is of particular concern because of the severe and permanent nature of many head and spine injuries.

The use of protective head gear was adopted as standard practice, early in the history of motor sports. A helmet with a padded interior and a hard shell exterior is the current protective head gear of choice. The Safety Foundation Institute has been formed to set safety standards for equipment and to test equipment for certification. Standards have been set to provide a reasonable level of safety in view of the typical speed at which particular equipment will be used.

In addition to safety helmets, vehicles having a chassis are frequently equipped with a roll support structure to support the vehicle or resist the force of impact, in the event of a roll over or collision with another vehicle. Roll bars and roll cages are typical roll support structures. These structures are permanently attached to the vehicle and are designed to support the vehicle or resist the force of impact to avoid having the body of the occupant receive the force. Roll support structures are designed using physics and geometry to produce a structure of maximum strength. The vehicle body typically protects the lower body of the occupant, while the vehicle is being operated; however, the upper body is typically exposed above the chassis and other impact resistant parts of the vehicle. The roll support structure is typically installed proximate to the upper body of the occupant to protect the upper torso and head; the head and cervical spine are the most vulnerable to accidents. In order to support the weight of the vehicle and to resist collision impact, the roll support structure is typically comprised of rigid and hard members, such as steel or steel alloy, which can cause injury if the occupant contacts these members with an appreciable degree of speed. It is desirable to apply padding to the roll support structure members to reduce the potential for injury to the head and cervical spine. Head and spine injuries occur because of impact with roll bars and roll cages, at high speeds, even when approved protective helmets are being worn.

The Safety Foundation Institute has set standards for all safety equipment used in sanctioned motor sport events, including the padding applied to roll support structures. Safety Foundation Institute (SFI) standards have been adopted by Formula 1 Racing, NASCAR, BUSH, IRL, NHRA, IHRA, and SCCA. The Safety Foundation Institute has used the GADD severity index as a parameter in setting the standard for roll support structure padding. It is desirable that roll support structure padding have compressible and resilient properties as well as acceptable fire resistant properties. The initial standard required that the padding allow no greater force than that comparable to 200 times gravitational force be applied to the head or any limb coming into contact with the padding at any time during a standard "G" test. The padding material had to withstand a temperature of 1450 degrees Fahrenheit for at least 15 seconds without melting or dripping. Original standards required that the padding must establish a GADD severity index no higher than 1500. The GADD severity index was developed at Wayne State University Head Trauma Center and consists of an algorithm used to process test data to produce the index value. Subsequent data relating to head and cervical spine injuries highlighted the danger of severe injury from impact and the Safety Foundation Institute altered the roll support structure padding standard to require a GADD severity index of no higher than 1250.

In order to meet these rigid standards, all SFI approved roll support structure padding materials are relatively dense to prevent collapsing; consequently, the padding stops the movement of the occupant's head relatively quickly. The time interval during which the occupant's head is in contact with the padding and is decelerating, is termed "spike time" and typically falls within the range of two to four milliseconds. Dense padding materials have caused helmets, being worn by occupants, to crack on impact with the padding. Rapid deceleration of the head contributes to head and spine injuries. A relatively short spike time delivers a greater mechanical impulse to the head, contributing to more severe head injuries. A relatively short spike time indicates that the head stops more quickly while the upper torso continues to travel, causing the cervical spine to over extend, thus contributing to more severe spine injuries. At present, all SFI approved padding materials are dense and cannot be deformed by manual pressure. A more readily compressible material having a longer spike time is desirable. A longer spike time reduces the force applied to the head during each increment during the time interval, reducing the mechanical impulse delivered to the head and reducing extension of the cervical spine.

There is a need for a roll support structure padding which incorporates the compressible and resilient properties necessary to meet the GADD index standard and the "G" test, with temperature resistant properties necessary to meet the heat resistant standard in a padding material which can be readily molded, cut, and installed on roll support structures. There is a need for a roll support structure padding which is readily compressible and resilient so as to significantly lengthen the spike time duration and provide increased and adequate protection against head and cervical spine injuries.

SUMMARY OF THE INVENTION

The present invention is a roll support structure padding for use in a motor vehicle having a roll support structure comprised of interconnected rigid members. The roll support structure padding is a two component polyurethane. The polyurethane is formed by combining the two components in a predetermined proportion to produce a solid sheet having a foamed core and molded skin, with an overall density of approximately 0.34 grams per cubic centimeter (21 pounds per cubic foot). The padding of the present invention is compressible and yields to a deflection of 25% under pressure of 1.4 kilograms per square centimeter (20 pounds per square inch), a deflection of 65% under pressure of 8.74 kilograms per square centimeter (124 pounds per square inch) and has a 25% return under pressure of 0.78 kilograms per square centimeter (11 pounds per square inch). The foam core, of the padding of the present invention, has a hardness durometer rating of 25 A and the skin has a thickness of one to two millimeters and a hardness durometer rating of 70 A.

The material may be molded to appropriate size and shape for fitting on members of a roll support structure to at least partially encase the members in padding for preventing injury resulting from high speed contact with the members.

It is an object of the present invention to provide a compressible roll support structure padding which responds to impact with a GADD severity index of less than 1250.

It is a further object of the present invention to provide a roll support structure padding which responds to impact with incremental force not greater than 200 times gravitational force in a standard "G" test.

It is another object of the present invention to provide roll support structure padding which will resist heat up to 1450 degrees Fahrenheit without melting or dripping.

It is yet another object of the present invention to provide a roll support structure padding which compresses on impact to yield a spike time of approximately eleven milliseconds in a standard test for the GADD severity index.

BRIEF DESCRIPTION OF THE DRAWINGS

The present invention may be more fully understood and appreciated with reference to the accompanying drawings in which.

DETAILED DESCRIPTION OF THE PREFERRED EMBODIMENT

Figure 1:
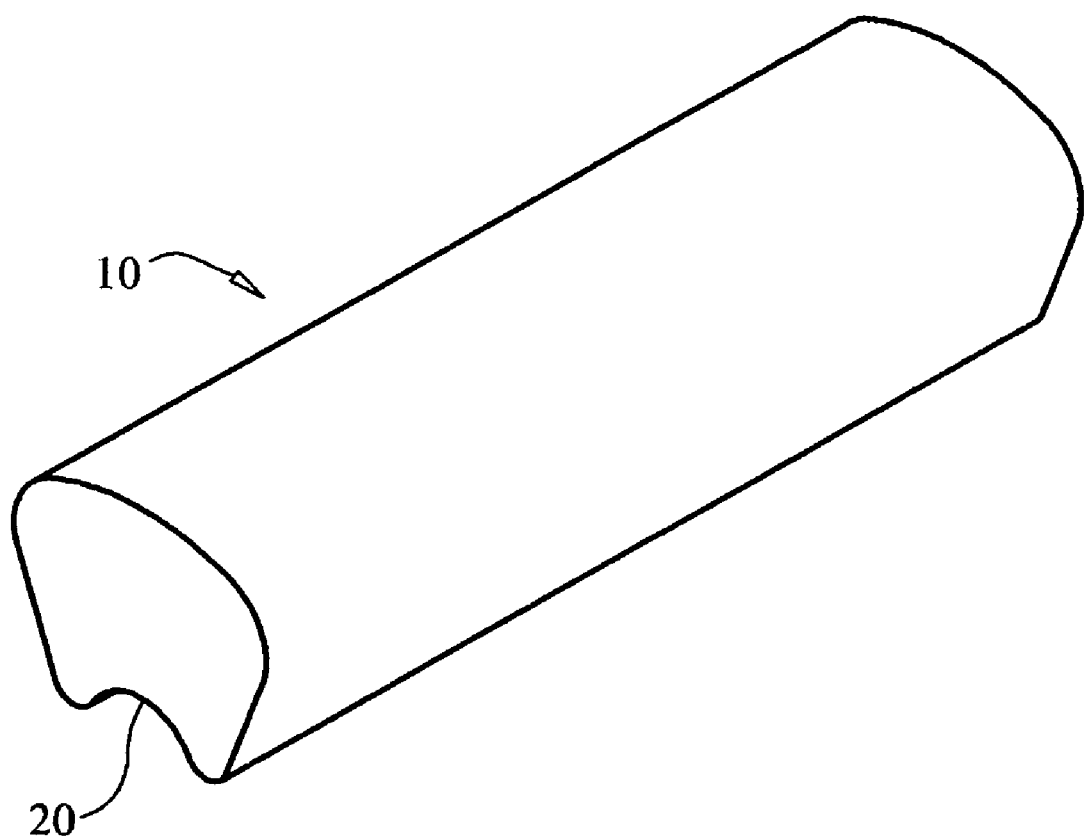
FIG. 1 is a perspective view of a section of the roll support structure padding of the present invention.

The roll support structure padding of the present invention is preferably formed of a two component polyurethane material having a density of approximately 0.3 grams per cubic centimeter (21 pounds per cubic foot). It is preferred that the material have compressibility and firmness characterized by approximately twenty five percent deflection under pressure of 1.4 kilograms per square centimeter (20 pounds per square inch), approximately 65 percent deflection under pressure of 8.7 kilograms per square centimeter (124 pounds per square inch) and approximately a twenty five percent return under pressure of 0.8 kilograms per square centimeter (11 pounds per square inch), for a sample of material having a thickness of approximately 2.5 centimeters (one inch).

The padding is produced by a conventional skin molding process to yield a skin having a thickness in the range of approximately one to two millimeters surrounding a foamed core. It is preferred that the skin have hardness, measured by a durometer of 70 A and that the foam core have a hardness of 25 A. It is preferred that the polyurethane be a conventional heat resistant variety. The two components may comprise a first component having a viscosity of approximately 900 cps and a weight of approximately 8.9 pounds per gallon. and a second component having a viscosity of approximately 450 cps, a weight of approximately 9.6 pounds per gallon, and a freeze point of 45 degrees Fahrenheit. It is preferred that the components be mixed in a proportion of 100 parts by weight of the first component to 75 parts by weight of the second component. It is preferred that the two components be combined and injected into a mold at a pressure of 1.6 kilograms per square centimeter (22.6 pounds per square inch) with a creme time of approximately 35 seconds, gel time of approximately 85 seconds, rise time of approximately 105 seconds and a demold time of approximately 5 minutes. The mixed components will have a density of approximately 0.1 grams per cubic centimeter (7.5 pounds per cubic foot). The preferred material, for producing the padding of the present invention, is a two component flexible integrated skin molded polyurethane manufactured by NCFI Polyurethanes, of Mt. Airy, N.C., available as part no. 31-067071.

Figure 2:
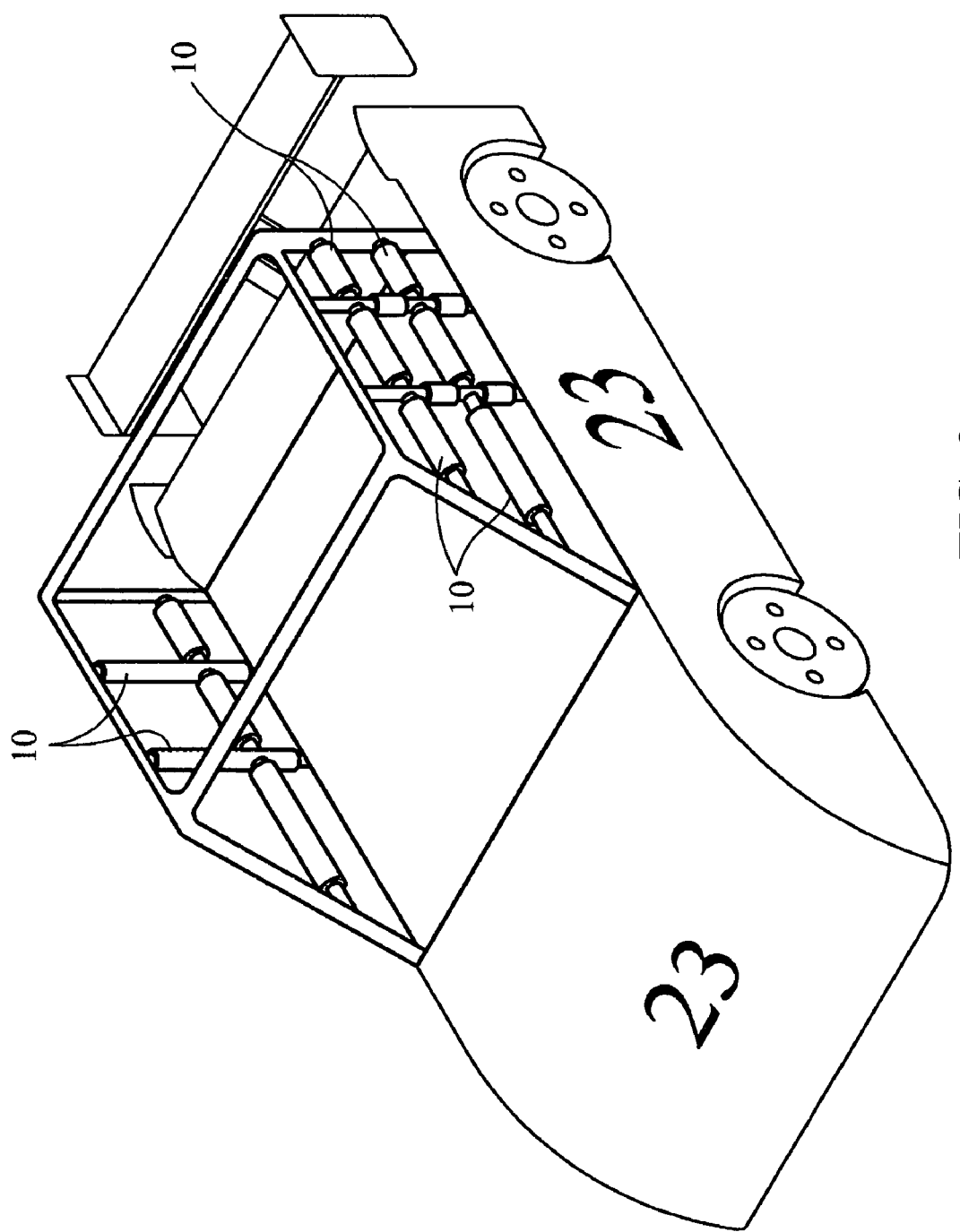
FIG. 2 is a perspective view of a vehicle mounted roll cage with roll support structure padding of the present invention installed on the rigid members of the roll cage.

It is intended that the roll structure padding, of the present invention, be adapted for installation on a vehicle having a roll support structure formed of rigid members. It is preferred that sections of the material be molded in the shape of an elongate body 10, as shown in FIG. 1. The body 10 is formed with a longitudinal open ended recess 20, for receiving a rigid member of a roll support structure to be partially encased within the recess 20. The body 10 would be sized so as to have a cross-sectional dimension of approximately two and one half centimeters (1 inch) measured from the boundary of the recess to the opposite edge. The padding is intended to be installed on a rigid member so as to partially encase the member within the recess 20, as shown in FIG. 2. It is preferred that the padding be fixed in place by adhesive bonding. Distilled cyanoacrylate (Super Glue®), or a silicone bonding agent are suitable adhesives. It is desirable to partially encase all roll support structure members which may come in contact with the body of the vehicle operator and to position each body 10 so that the two and one half centimeter thickness of padding lies in the potential path of a vehicle occupant moving toward the roll support structure. In the event of a collision or other movement of the vehicle, which causes the body of the operator to impact the roll support structure, the operator's body will be protected by the roll cage padding.

The operator's head and cervical spine are most susceptible to serious and permanent injuries resulting from impact with the roll support structure. When the operator's head contacts the roll support structure at a relatively high rate of speed, the roll support structure applies a decelerating force to the head. It is a desired function of the padding to compress, upon contact, and thereby reduce the incremental force applied to the head so that the rate of deceleration is reduced and the time over which force acts upon the head is lengthened. The reduction in the incremental force is credited with reducing the potential for serious injuries. The Safety Foundation Institute (SFI) has adopted standards for safety equipment, including roll support structure padding. The tests designed to measure compliance with the standards evaluate the capacity of padding material to reduce the incremental force between the padding and an object during the time of an impact. The test measures the time required for complete deceleration, known as spike time and uses the spike time to derive the incremental force applied to the head.

The GADD severity index is a mathematical construct developed to relate the potential for a severe injury to the rate at which the kinetic energy of a moving body is reduced. Kinetic energy, at a given time, is proportional to the mass of the body multiplied by the square of the speed. A greater decelerating force applied to the body will increase the rate at which the kinetic energy is reduced. The GADD severity index is based on the premise that greater force increases the potential for a severe injury. When a moving body contacts a fixed structure, the kinetic energy decreases to zero as the body decelerates from a speed at impact to zero. The force acting over the distance traveled during the time of contact equals the initial amount of kinetic energy.

It is desirable to produce padding having properties of compressibility and resiliency to increase the distance traveled by the body before coming to rest and thereby reducing the force acting on the body at all incremental times during the period of contact. The directly proportional relation of speed to distance and time allows the degree of force applied to the body to be valued by measuring the time of the interaction rather than the travel distance, as it is more convenient to measure the time. This time during which deceleration occurs is referred to as spike time and the spike time is used to measure the effectiveness of the padding material.

The padding of the present invention achieved a spike time of eleven milliseconds, which is five milliseconds, or more, longer than the currently available padding. During the spike time, the padding of the present invention compressed more than 1.9 centimeters (0.75 inches) providing a softer impact and less violent extension of the cervical spine, which is sufficiently less violent to avert injury involving a broken neck. The padding of the present invention satisfies the temperature requirements of the Safety Foundation Institute and has a GADD severity index of 810.

SFI also applies a "G" test to determine whether a particular padding material will show a result below 200 G. The test uses a model human head weighing 4.91 kilograms dropped from a height of 92.4 centimeters and reaching a velocity of between 4.4 and 4.53 meters per second. Accelerometer equipment is used to measure the deceleration of the head model. In order to pass the standard test, the padding must absorb at least impact above 200 G and for the second impact, the padding must absorb at least impact above 163 G. The padding of the present invention achieves a test result of 169 G on first impact and a figure below 163 G, on second impact.

The padding of the present invention reduces the force applied to the head by two to five times over currently available products as per Newton's Second Law of Physics. The padding of the present invention meets or exceeds all SFI safety standards for roll support structure padding.

Having fully described the present invention, it may be understood that minor variations may be introduced without departing from the scope of the invention as disclosed and claimed herein.

I claim:

1. In a motor vehicle having a roll support structure, for resisting force generated by impact, a roll support structure padding comprising:
    a two component flexible integrated skin molded fire resistant polyurethane, having a skin surrounding a foam core;
    said polyurethane having a density of approximately 0.3 grams per cubic centimeter;
    said polyurethane displaying a deflection of twenty five percent under pressure of approximately 1.4 kilograms per square centimeter;
    said polyurethane displaying a deflection of sixty five percent under pressure of approximately 8.7 kilograms per square centimeter;
    said polyurethane displaying a return of twenty five percent under pressure of approximately 0.8 kilograms per square centimeter;
    said polyurethane having a durometer of 70 A, for said skin and 25 A, for said foam core;
    whereby said padding may be installed so as to partially encase said roll support structure for protecting an operator of said motor vehicle from injury caused by impact with said support structure.

2. The roll support structure padding of claim 1, wherein, said skin molded polyurethane comprises flexible integrated skin molded polyurethane, part no. 31-067071, manufactured by NCFI Polyurethanes.

3. The process of installing padding on a roll support structure, in a motor vehicle having a roll support structure, formed of rigid members, for resisting force generated by impact, comprising the steps of:
    providing roll structure support padding comprising,
    a two component flexible integrated skin molded fire resistant polyurethane, having a skin surrounding a foam core;
    said polyurethane having a density of approximately 0.3 grams per cubic centimeter;
    said polyurethane displaying a deflection of twenty five percent under pressure of approximately 1.4 kilograms per square centimeter;
    said polyurethane displaying a deflection of sixty five percent under pressure of approximately 8.7 kilograms per square centimeter;
    said polyurethane displaying a return of twenty five percent under pressure of approximately 0.8 kilograms per square centimeter;
    said polyurethane having a durometer of 70 A, for said skin and 25 A, for said foam core;
    affixing said padding to said members by adhesive bonding such that said padding at least partially encases said members for cushioning the impact received by a vehicle occupant colliding with roll support structure.

4. The process of claim 3, wherein said skin molded polyurethane comprises flexible integrated skin molded polyurethane, part no. 31-067071, manufactured by NCFI Polyurethanes.

* * * * *